March 27, 1945. D. M. MacMILLAN 2,372,217
RECAP MOLD
Filed April 29, 1943 2 Sheets-Sheet 1
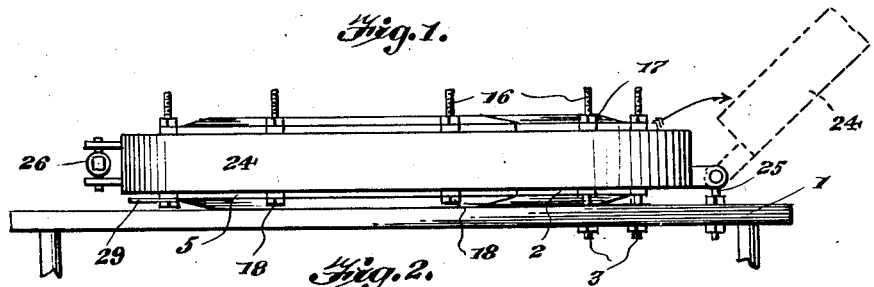
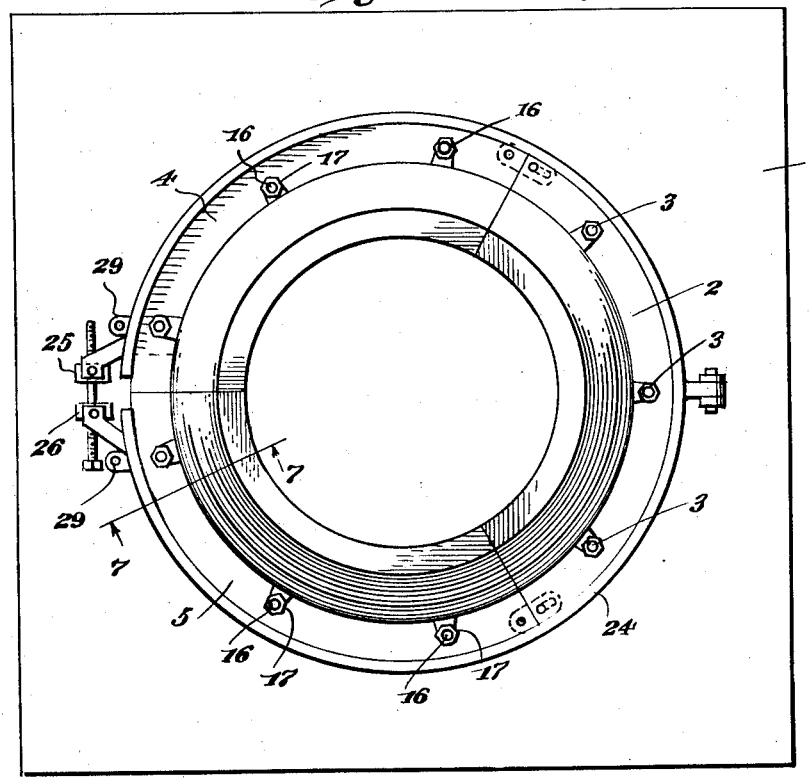
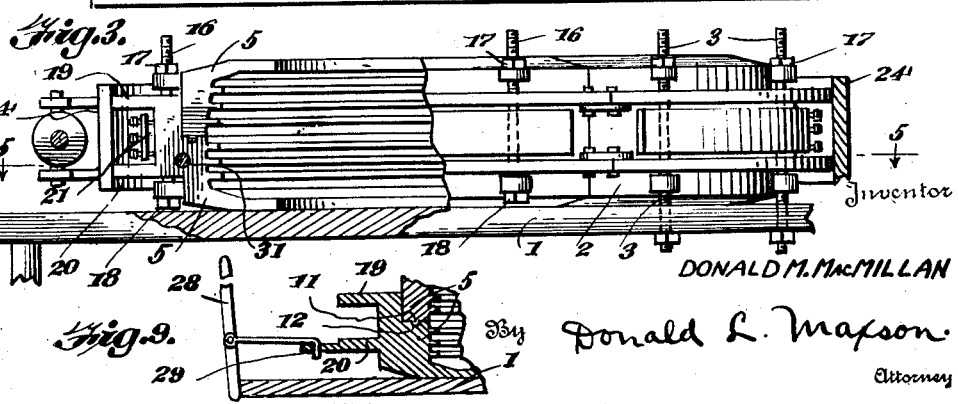
Inventor
DONALD M. MacMILLAN
By Donald L. Maxson.
Attorney March 27, 1945. D. M. MacMILLAN 2,372,217
RECAP MOLD
Filed April 29, 1943 2 Sheets-Sheet 2
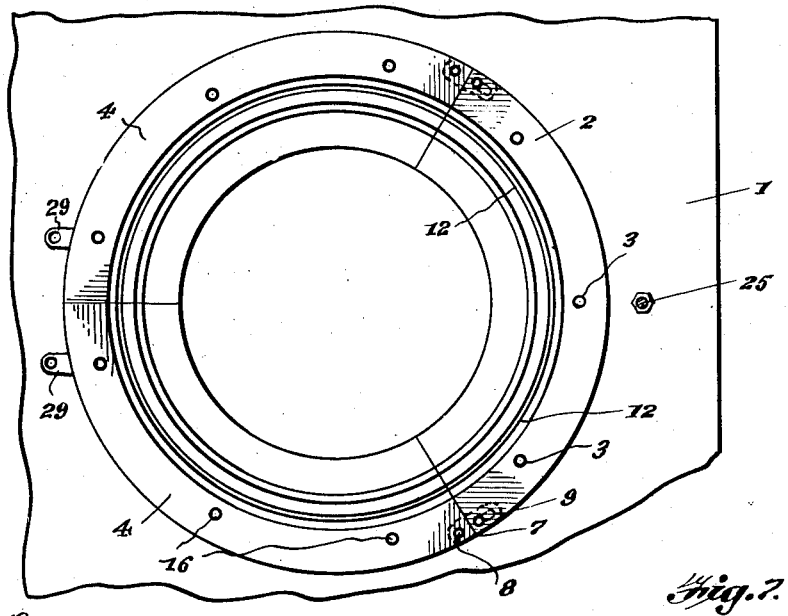
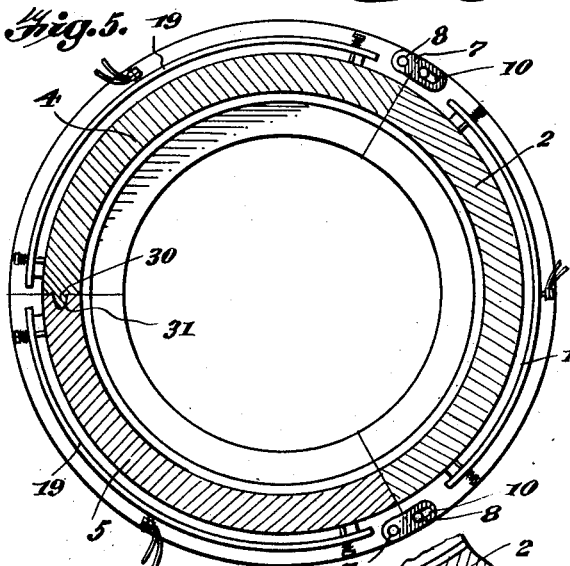
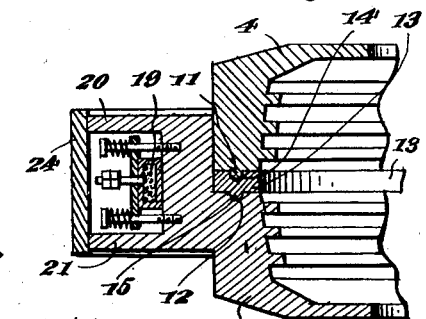
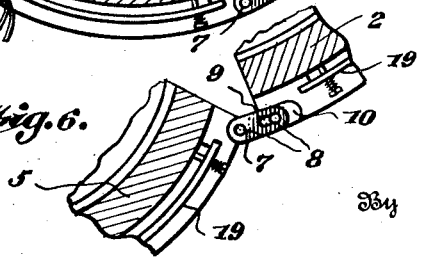
Inventor
DONALD M. MACMILLAN
By Donald L. Mayeon
Attorney Patented Mar. 27, 1945

2,372,217

UNITED STATES PATENT OFFICE 2,372,217

RECAP MOLD

Donald M. MacMillan, Macon, Ga.

Application April 29, 1943, Serial No. 485,055

5 Claims. (Cl. 18—18)

This invention relates to improvements in recap molds, and more particularly to a mold having a plurality of cooperating mold body sections hinged at their ends to adjacent mold body sections and each section being split circumferentially of its length and held together by a plurality of body bolts, whereby said bolts may be loosened and spacer elements inserted between the split body sections for changing the width of the matrix to accommodate tire casings of varying sizes.

An object of my invention is to provide an improved recap mold including a plurality of circumferentially split mold body sections hinged together for encirclement about a tire casing to be recapped, together with heating elements carried by the lower split mold body sections, and an adjustable and flexible clamping band cooperating therewith pivotally supported upon a table upon which the mold is mounted and adapted to be swung over and about said body sections after a tire casing is in place in the mold, and air admitted to the curing bag within the tire casing to firmly hold the tire casing against the matrix during the recapping operation.

Another object of the invention is to provide an improved recap mold including a plurality of circumferentially split mold body sections hinged together at their ends and each section supporting a strip heating unit, and a cooperating adjustable clamping band adapted to be swung over the mold sections during the recapping process, and the said clamping band loosened and swung up and away from the sections after the recapping process has been completed, so that the mold sections may be swung outwardly on their hinges or peeled from the recapped casing so that the same may be readily removed from the mold.

A still further object of my invention is to provide an improved recap mold having a plurality of cooperating circumferentially split mold sections hinged together at their ends, each section being hinged to the adjacent section by means of a pair of slidable links mounted on pivot pins and arranged so that the sections may be approximately equally spaced from each other when the sections are in closed position about a tire casing, after which a flexible band will be swung over the sections to hold them in place while the recapping process is being completed.

A still further object of the invention is to provide a recap mold having circumferentially split mold sections, each carrying its own heating band, and each being hinged to the adjacent section, and adapted to receive spacer elements between cooperating sections, and a flexible and adjustable clamping band adapted to be positioned about the sections to hold them in clamped position about a tire casing while it is being recapped.

Other objects will appear as the description proceeds.

In the accompanying drawings which form a part of my application,

Figure 1 is a side elevation of my improved recap mold;

Figure 2 is a plan view of my improved recap mold;

Figure 3 is a side elevation partly in section showing the matrix sections and the relative positions of the heating and clamping bands;

Figure 4 is a plan view of the lower mold sections with the upper mold sections removed;

Figure 5 is a sectional view taken on the line 5—5 of Figure 3;

Figure 6 is a partial detail sectional view showing the hinge construction between adjacent mold sections;

Figure 7 is a sectional view taken on the line 7—7 of Figure 2;

Figure 8 is an edge view showing the hinges between adjacent mold sections, and

Figure 9 is a detail view partly in section showing one type of pulling implement used for pulling the mold sections apart after the recapping has been completed.

Like characters of reference are used throughout the following specification and the accompanying drawings to designate corresponding parts.

In carrying out my invention, I provide a suitable supporting table 1 upon which the central mold section 2 is fastened by means of the bolts 3. Mold sections 4 and 5 are secured to the central mold section 2 by means of the pair of slidable links 6 and 7, mounted upon the pins 8, and formed with the slots 9 for permitting a lengthening and shortening of the gaps between the mold sections. Slots 10 are formed in the opposite ends of the mold section 2, so that the links 6 and 7 may be received therein when the mold sections are closed about a tire casing. The hinge construction with the slidable links with slots are so arranged that the space between adjacent mold sections will be approximately equalized when the sections are closed and in position about a tire casing.

The mold sections 2, 4 and 5 are split circumferentially and the upper portions of the three sections are formed with an annular bead 11.

which is adapted to be received within the annular groove 12 in the upper surface of the lower mold sections, thereby insuring a tight joint between said cooperating sections. If it is desired to increase the dimensions of the matrix sections, one or more spacer elements 13, having grooves 14 in their upper surfaces, and beads 15 depending from their lower faces are adapted to be received between the cooperating mold sections, as clearly illustrated in Figure 7 of the drawings. A plurality of bolts 16 having nuts 17 and 18 upon their upper and lower ends respectively are passed through cooperating mold sections to hold them in assembled position, and these bolts are loosened when it is desired to insert the spacer elements between the split mold sections. As before mentioned, these spacer elements may be of different thicknesses to provide for the adaptation of the mold for recapping oversize tire casings, or tire casings of several different sizes.

As shown in Figures 2, 3 and 7, each mold section is provided with an individual heater strip 19, which are supported between the spaced annular flanges 20 and 21 formed on the peripheral extension 22 on the lower mold sections. The heater strips 19 are resiliently mounted to contact the adjacent faces of the matrix sections, and have connections 23 for electrical connection with a suitable source of electrical energy, and any suitable form of thermostat may be used with the strip heaters to maintain the temperature at the desired level.

An adjustable and flexible clamping band 24 is pivotally supported upon the table 1, on the bolt 25, and is provided at its adjacent free ends with the toggles 25 and 26, through which the adjusting screw 27 extends, said toggles being in the form of threaded nuts, and arranged to open the band 24 when the screw is rotated in one direction, and to close the band when it is rotated in the opposite direction. A suitable manually operated pulling implement 28 will be used to engage in the eyes 29 formed on the mold sections 4 and 5 when it is desired to open the sections after a tire casing has been recapped and is to be removed.

In summarizing the construction and operation of my improved recap mold, it will be apparent that the matrix sections are split circumferentially into upper and and lower sections, that the upper section is provided with a depending annular bead while the lower section is provided with an annular groove, and that each mold section carries individual heater strips which are carried by the lower sections. Spacer elements provided with grooves on their upper surfaces and with depending beads on their lower surfaces cooperate with the split mold sections and are mounted between the upper and lower sections to adapt the mold to receive varying sizes of tires for recapping. Also several different thicknesses of the spacer elements may be used. A curing bag and curing rim (not shown) will be used within the tire casing when the casing is being recapped to hold the same in perfect contact with the inner surface of the matrix. Furthermore, any desired type of thermostat may be used on each matrix section to control the heat. The use of separate heater strips on each matrix segment allows a more free motion of the retainer or clamping band in being open and closed by means of the adjusting screw. As before mentioned the use of the hinge link construction permits the equal spacing of the matrix sections when the mold is closed, by having a sliding adjustment as well as a hinge action.

A dowel pin 30 is formed on the front end of the segment 4 to seat in and engage the opening 31 formed in the end of the segment 5, thereby serving to lock the two segments together more perfectly when the clamping band is over the mold sections.

While I have illustrated and described one embodiment of my improved recap mold, it will be understood that I do not limit myself to the exact construction, as many minor changes in detail of construction may be resorted to without departure from the spirit of the invention.

Having thus described my invention what I claim as new and desire to secure by Letters Patent of the United States is:

1. A tire casing recap mold comprising a plurality of circumferentially split arcuate mold sections, sliding hinge means connecting said mold sections, heating bands carried by said mold sections, and an adjustable clamping band positioned about said mold sections to hold them in adjusted position while the tire casing is being recapped.

2. A tire casing recap mold comprising a plurality of arcuate mold sections each split circumferentially to form upper and lower segments, hinge means connecting the lower mold segments, adjustable fastening means for holding the upper and lower segments of each section together and an adjustable clamping and locking band positioned about said mold sections to hold them in position while recapping a tire casing.

3. A tire casing recap mold comprising a plurality of arcuate mold sections each split circumferentially into segments, adjustable fastening means for holding segments of each section together, resiliently mounted heating means carried by each of said mold sections, and a flexible clamping band positioned about said mold sections to hold them in position while recapping a tire casing.

4. A tire casing recap mold comprising a plurality of arcuate mold sections each split circumferentially into segments adapted to be positioned about a tire casing to form a complete circle, slidable hinge means connecting said mold sections, adjustable fastening means for holding the segments of each section together, spacer elements positioned between the segments of each section, individual heating bands resiliently mounted upon each of said mold sections, and an adjustable and flexible clamping band positioned about said mold section to hold the mold sections in position while the said tire casing is being recapped, said band being pivotally mounted whereby it may be swung away from said mold sections after the recapping process has been completed.

5. A tire casing recap mold comprising three arcuate mold sections each split circumferentially into segments, a support for said mold, one of said mold sections being fastened in fixed position on said support and the remaining mold sections being movable relative to said fixed section, slidable hinge connections between the movable mold sections and the fixed mold section, and an adjustable clamping band supported by said support and hinged thereto, and positioned about said mold sections while the tire casing is being recapped.

DONALD M. MacMILLAN.